United States Patent [19]
Tsunoda

[11] Patent Number: 6,079,345
[45] Date of Patent: Jun. 27, 2000

[54] SYSTEM AND METHOD FOR CONTROLLING THE FLOW OF A CONDUCTIVE FLUID OVER A SURFACE

[75] Inventor: Stanley I. Tsunoda, Encinitas, Calif.

[73] Assignee: General Atomics, San Diego, Calif.

[21] Appl. No.: 09/099,811

[22] Filed: Jun. 19, 1998

[51] Int. Cl.[7] .................................................... B63B 1/34
[52] U.S. Cl. ........................................ 114/67 R; 244/205
[58] Field of Search ............................... 114/67 R, 67 A; 244/205

[56] References Cited

U.S. PATENT DOCUMENTS

| | | | |
|---|---|---|---|
| 2,946,541 | 7/1960 | Boyd | 244/42 |
| 3,095,163 | 6/1963 | Hill | 244/12 |
| 3,162,398 | 12/1964 | Clauser et al. | 244/14 |
| 3,360,220 | 12/1967 | Meyer | 244/42 |
| 4,516,747 | 5/1985 | Lurz | 244/204 |
| 5,040,560 | 8/1991 | Glezer et al. | 137/13 |
| 5,320,309 | 6/1994 | Nosenchuck et al. | 244/205 |
| 5,437,421 | 8/1995 | Nosenchuck et al. | 244/205 |
| 5,439,191 | 8/1995 | Nichols et al. | 244/169 |
| 5,791,275 | 8/1998 | Bandyopadhyay | 114/67 R |
| 5,890,681 | 4/1999 | Meng | 244/205 |
| 5,964,433 | 10/1999 | Nosenchuck | 244/205 |

*Primary Examiner*—Sherman Basinger
*Attorney, Agent, or Firm*—Fitch, Even, Tabin & Flannery

[57] ABSTRACT

Magnetic and electric fields are used in a controlled manner to create Lorentz forces that affect the flow of a conductive fluid near the boundary layer of a control tile, or a matrix of control tiles, immersed in a conductive fluid. The control tiles are combined to form control cells, with each control cell including a pair of electrodes and at least one permanent magnet. The pair of electrodes are coupled to a current source which biases the electrodes to cause an electrical current to flow from a positive electrode (anode), through the conductive fluid in which the cell electrodes are immersed, to a negative electrode (cathode). The current source is time multiplexed to better control the direction of the current flow between adjacent electrodes. The permanent magnet(s) generates a magnetic field which interacts with the electrical current to create a Lorentz force that influences the flow of the conductive fluid, near the boundary of the control tile, e.g., reduces drag of the fluid as it flows over the tile surface. The invention may be used, e.g., within the hull of an ocean-going ship to locally or globally reduce or increase the drag of the sea water passing over the surface of the hull.

40 Claims, 7 Drawing Sheets

SYSTEM AND METHOD FOR CONTROLLING THE FLOW OF A CONDUCTIVE FLUID OVER A SURFACE

BACKGROUND OF THE INVENTION

The present invention relates to systems and methods for controlling the flow of a conductive fluid over a surface, and more particularly to a system and method that uses magnetic and electric fields to create Lorentz forces that affect the flow of a conductive fluid in a controlled manner near the boundary layer of a control tile, or a matrix of control tiles, immersed in the conductive fluid.

Conductive fluids naturally occur in many different settings. Note, that for purposes of this application, the term "fluid" is used in its broad scientific sense to connote a liquid or a gas. Wherever such a conductive fluid is encountered, there is typically a need or desire to move a vessel or other object through the conductive fluid using a minimal amount of energy. One way to meet this need is to design such vessel or object so that the conductive fluid flows over the surface thereof with a minimal amount of drag.

Perhaps the most common example of a conductive fluid is sea water, which covers a significant percentage of the earth's surface. Ocean-going vessels traveling through such fluid, e.g., ships or submarines, must exert significant amounts of energy in order to successfully navigate through such fluid (sea water) at a suitable speed. Hence, much attention has been directed over the years to optimally design the hull or shape of an ocean-going vessel in order reduce the drag (friction) the fluid encounters as it passes over the surface of the vessel. Despite such efforts, however, there remains a continual need to further reduce the drag encountered by conductive fluids passing over the surface of such vessels to thereby make the movement of such vessels through the fluid more efficient.

As is known in the art, a viscous fluid, and a body completely immersed in the fluid, form a boundary layer at the body's surface when the fluid and the body move relative to each other. That is, the layer of fluid in contact with the body is essentially at rest, while in an area removed from the body, the fluid is moving at its free-stream velocity. The region between the body and that area is known as a boundary layer. Where the fluid is a conductive fluid, electromagnetic forces may be introduced into the boundary layer in an attempt to alter the boundary layer characteristics. See, e.g., U.S. Pat. No. 5,437,421.

There remains a need, however, to more favorably alter the characteristics of the boundary layer than has heretofore been achieved. That is, there remains a need to optimally alter or affect the boundary characteristics in a way that most significantly reduces the drag of the fluid as it passes over the body.

SUMMARY OF THE INVENTION

The present invention addresses the above and other needs by using magnetic and electric fields in a controlled manner so as to create Lorentz forces that affect the flow of a conductive fluid near the boundary layer of a control tile, or a matrix of control tiles, immersed in a conductive fluid. More specifically, the Lorentz forces created by the invention combine to form a vortex wavefront transverse to the fluid flow direction, which vortex wavefront advantageously reduces drag of the conductive fluid over the matrix of control tiles. When such matrix of control tiles is formed or mounted on a surface immersed within a conductive fluid, the invention may thus be used to render movement of such surface through such conductive fluid more efficient, i.e., with less drag.

The control tiles used with the invention are combined to form control cells, with each control cell including a pair of electrodes and at least one permanent magnet. The pair of electrodes are coupled to a current source which biases the electrodes to cause an electrical current to flow from a positive electrode (anode), through the conductive fluid in which the cell electrodes are immersed, to a negative electrode (cathode). The current source is time multiplexed to better control the direction of the current flow between adjacent electrodes. The permanent magnet(s) generates a magnetic field which interacts with the electrical current to create a Lorentz force that influences the flow of the conductive fluid, near the boundary of the control tile, e.g., reduces drag of the fluid as it flows over the tile surface.

A primary application of the invention is to place or form such control tiles or cells within the hull of an ocean-going ship, thereby reducing the drag of the sea water passing over the surface of the hull, thereby making movement of the ocean-going ship through the sea water more efficient. It is to be emphasized, however, that the invention is not limited to use only within the hull of a ship. Rather, the invention may be used for any application where a surface must be moved or propelled within a conductive fluid, and where such conductive "fluid" may comprise either a liquid or a gas. Thus, for example, the invention could also be used within or on the shell surface of an aircraft, e.g., a space shuttle craft or an airplane, where such aircraft must pass through an ionically-charged atmosphere.

It is also important to note that drag reduction, such as is achieved with the present invention, facilitates a more stealthy movement through the medium because decreased turbulence produces less acoustic emission from the vessel or aircraft. Hence, the present invention may advantageously be used to make it more difficult for enemies to detect a submarine or other vessel moving through sea water.

There are many other uses and applications for the drag reduction achieved by the invention, in addition to those enumerated above. For example, a reduction in drag through use of the present invention may be used to improve the flow of conductive fluids through a pipe. The invention may also be used to increase drag in order to achieve enhanced braking of ocean going vessels, or of aircraft or spacecraft traveling through an ionized medium. Additionally, decreased or increased drag (achieved through use of the invention) provides an effective way to achieve rudderless steering of ocean-going vessels, or of aircraft or spacecraft that travel through an ionized medium. Indeed, there are many applications for the present invention. Any application where a reduced fluid drag, or a controlled fluid drag, is required or desired, may benefit from the invention.

One embodiment of the invention may be characterized as an apparatus or method for controlling the flow of a conductive fluid over a control surface immersible within the conductive fluid. Such apparatus or method includes means for propelling the control surface through the conductive fluid; and means for electromagnetically generating at least one vortex wavefront on the control surface that passes over the control surface as the control surface moves through the conductive fluid. It is this vortex wavefront that reduces the drag associated with the flow of the conductive fluid over the control surface. In accordance with one aspect of the invention, the vortex wavefront is formed at right angles to the direction of fluid flow over the control surface.

Another embodiment of the invention may be similarly characterized as an apparatus for controlling the flow of a conductive fluid over a control surface. In broad terms, such apparatus includes a matrix of electrodes spread over the control surface. Further included is a means for biasing selected electrodes in pairs so that two of the electrodes within the matrix of electrodes function as an electrode pair, with each electrode pair having an anode electrode and a cathode electrode. This arrangement allows an electrical current to flow from the anode electrode of each electrode pair through the conductive fluid to the cathode electrode of the electrode pair. There is also included a means for generating a magnetic field having magnetic flux lines that are transverse to the electrical current flowing through the conductive fluid. The combination of the electrical current and the magnetic flux cause a Lorentz force to be created that is transverse to both the electrical current and magnetic flux lines. This Lorentz force affects the flow of the conductive fluid over the control surface. More specifically, the biasing means includes time multiplexing means for time multiplexing the electrical current to assure a desired sourcing/sinking relationship of the electrical current: between selected electrode pairs exists so that a coordinated pattern of Lorentz forces is created that affects the flow of the conductive fluid over the control surface in a desired manner, e.g., to reduce drag.

In accordance with an important aspect of the invention, the time multiplexing means forces electrical current sourced from one anode electrode to be sunk at a desired adjacent cathode electrode and not at a non-desired adjacent cathode electrode. Carefully controlling which electrodes source and sink current in this manner through the use of the time multiplexing means advantageously allows the induced Lorentz forces to create a vortex wavefront that is at a desired angle, e.g., transverse, relative to the direction of fluid flow over the control surface. It is this vortex wavefront that is primarily responsible for reducing the drag associated with the fluid flow over the control surface.

It is a feature of the invention to provide beneficial control of fluid motion over a surface, e.g., to reduce drag as a conductive fluid flows over the surface.

It is another feature of the invention to provide a time-multiplexed current driver for use with a matrix of electrodes on a control surface immersible in a conductive fluid which, in combination with a magnetic field, steers resulting Lorentz forces for beneficial purposes. More particularly, it is a feature of the invention to provide such Lorentz forces so as to create a vortex wavefront that significantly reduces drag as the conductive fluid passes over the control surface.

It is yet another feature of the invention to provide a control surface, immersible in a conductive fluid such as seawater, which when electromagnetically energized, exhibits a reduced drag as such surface moves through the conductive fluid.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1A:
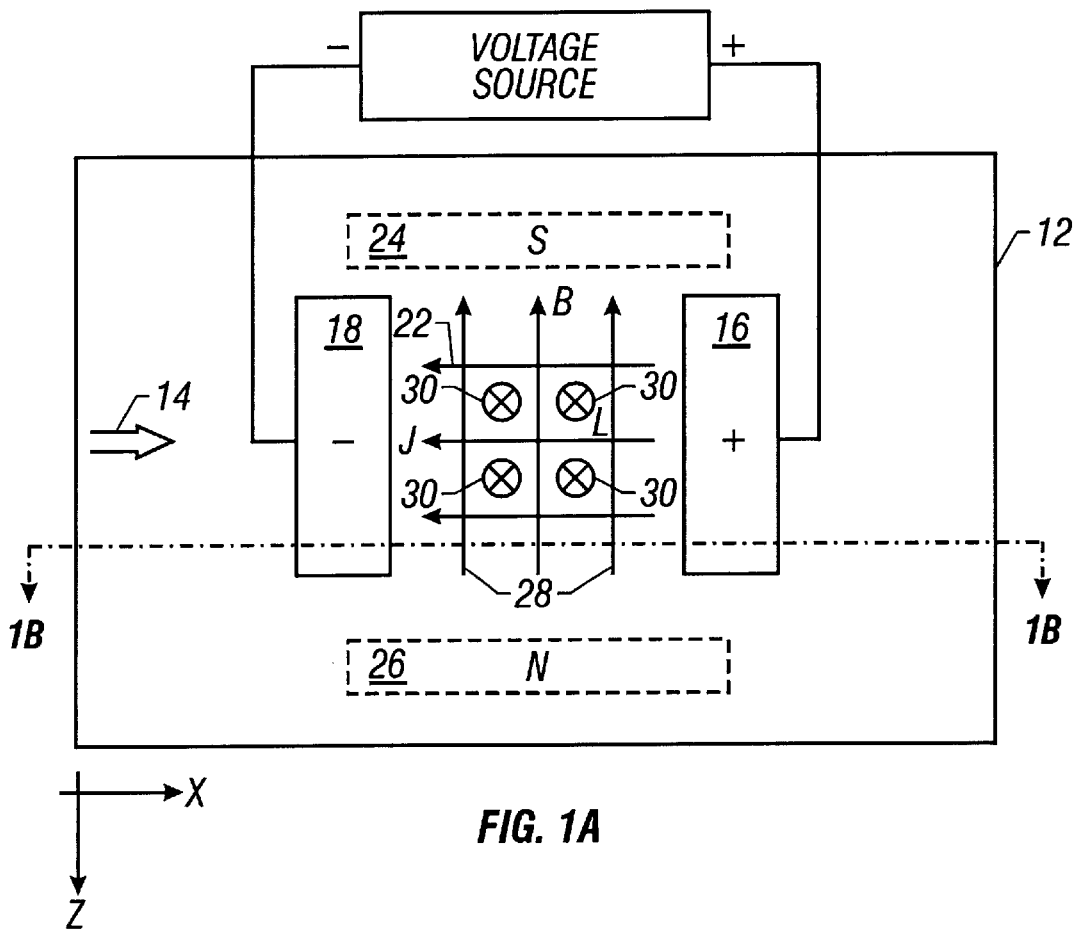
FIG. 1A shows a plan view of a conventional single cell fluid control device.
Figure 1B:
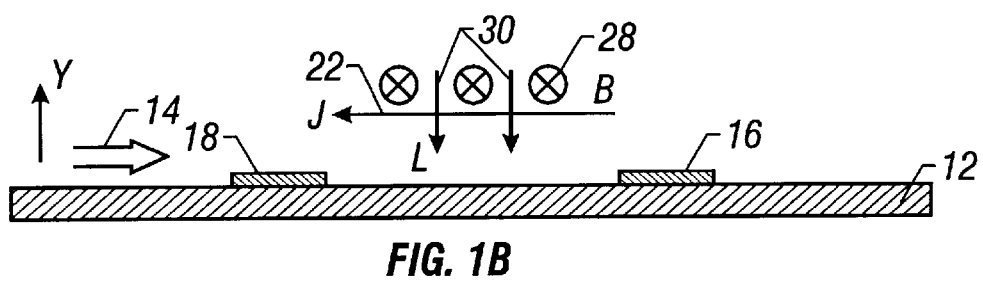
FIG. 1B shows a sectional view of the control device of FIG. 1A taken along the line 1B—1B.

To better understand and appreciate the present invention, it will first be beneficial to have a basic understanding of how fluid control has been attempted in the prior art. Some basic teachings relative to the prior art were presented above in the Background portion of this application. Additional detail concerning the prior art technique for fluid flow control is illustrated in FIGS. 1A and 1B. FIG. 1A shows a plan view of a single cell fluid control device made in accordance with the teachings of the prior art, and FIG. 1B shows a sectional view of the prior art control device of FIG.

1A taken along the line 1B—1B. The single cell device is formed on a suitable panel or substrate 12. Such panel 12 is designed to be exposed to fluid flow, represented in FIGS. 1A and 1B by the double arrow 14. That is, as drawn in FIGS. 1A and 1B, it is contemplated that fluid will flow over the panel 12 from left to right.

A first pair of electrodes 16, 18 is placed on a top surface (the surface exposed to the fluid flow) of the panel 12. The electrode 16 is electrically connected to the positive side of a voltage source 20, and the electrode 18 is electrically connected to the negative side of the voltage source 20. Thus, in the presence of a conductive fluid, an electric current, J, represented in the figures by the vector arrows 22, will thus flow from the positive electrode 16 to the negative electrode 18.

Positioned behind the panel 12 are a pair of permanent magnets 24 and 26. (These magnets 24 and 26 have been omitted from FIG. 1B for clarity.) The south pole S of the magnet 24 is positioned closest to the back side of the panel 12, while the north pole N is likewise positioned closest to the back side of the panel 12. A magnetic field, B, is thus established by the presence of the magnets 24 and 26. This magnetic field B has a polarity (direction) as illustrated by the vector arrows 28 in FIGS. 1A and 1B. Note that in FIG. 1B, the magnetic field B points into the paper, and thus the vector arrows 28 representing the magnetic field B are illustrated by the symbol $\otimes$ (an "x" within a circle, which is symbolic of looking at the back end of an arrow). If a vector arrow were pointing out of the plane of the paper, it would be represented by the symbol $\odot$ (a dot within a circle, symbolic of looking at the front end of an arrow).

As is evident from FIGS. 1A and 1B, the electric current J and the magnetic field B are established so as to be substantially transverse (perpendicular) to each other. As is known in the art, whenever an electric current J is acted upon by a magnetic field B, a Lorentz force, L, is established that is perpendicular to both the current J and the magnetic field B. This Lorentz force L is represented in FIGS. 1A and 1B by the vector arrows 30. As seen in FIG. 1A, the vector arrows 30 representing the Lorentz Force L are directed into the plane of the paper, and are thus represented by the symbol $\otimes$; while in FIG. 1B, the Lorentz Force is directed downward (in the "y" direction, of the x-y-z coordinate system illustrated in FIGS. 1A and 1B), toward the panel 12.

Figure 2A:
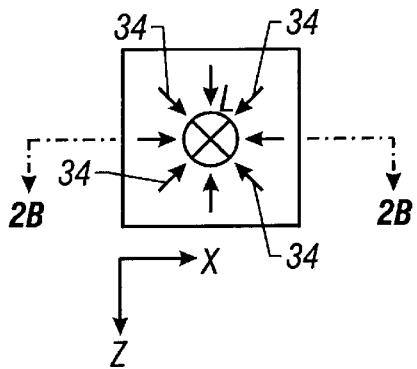
FIG. 2A illustrates a plan view of a simplified representation of a single-cell fluid control device having a force vector L centered in the cell and oriented in the −y direction.
Figure 2B:
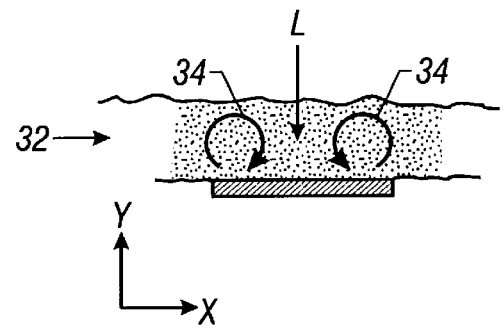
FIG. 2B is a sectional view of the simplified cell of FIG. 2A taken along the line 2B—2B, and illustrates the vortexes that are created in a fluid layer above the cell in the presence of such vector L.

Turning next to FIGS. 2A, 2B, 2C, 2D and 2E, there is shown a sequence of diagrams that illustrate the effect the Lorentz force, L, also referred to herein as a force vector L, has on a fluid that passes over the surface of cell, or matrix of cells, wherein the Lorentz force L is present. FIG. 2A illustrates a plan view of a simplified representation of a single-cell fluid control device having a force vector L centered in the cell and oriented in the −y direction (into the plane of the paper); while FIG. 2B shows a sectional view of the simplified cell of FIG. 2A taken along the line 2B—2B. As seen in these two figures, the force vector L tends to create a vortex (or whirling pattern) 34 in a fluid layer 32 above the cell.

Figure 2C:
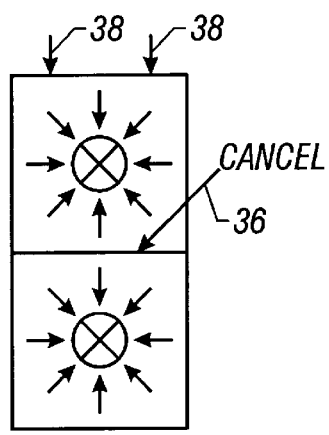
FIG. 2C is a plan view of adjacent cells as in FIG. 2A, and further illustrates the regions where the vortexes cancel and add in the presence of a central vectors L.
Figure 2D:
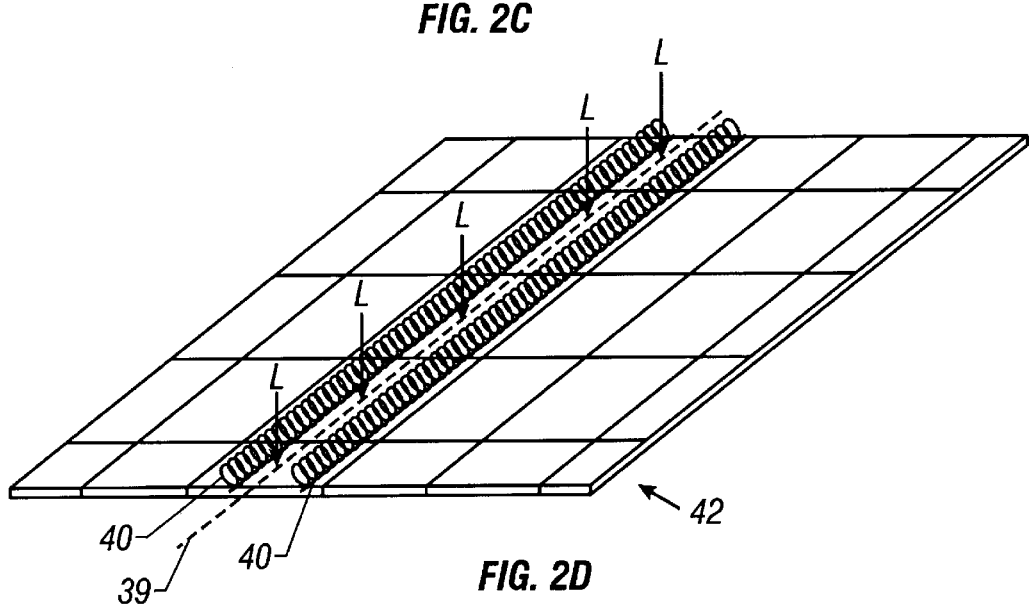
FIG. 2D illustrates a panel formed of fluid control cell devices like that shown in FIG. 2A, and conceptually illustrates how one or more roller vortexes ("rollers") are created when aligned vector Lorentz forces L are applied to the cells, with the rollers having a wavefront that parallels the alignment axis.

For a single cell device, the vortexes 34 are generally created around the force vector L, as though the force vector L were pushing the fluid layer 34 down into the surface in the center of the cell, with the fluid whirling out away from the center point, as seen best in FIG. 2B. When two such cells are positioned adjacent each other, as shown in FIG. 2C, then the whirling motion established within the fluid layer 32 tends to cancel in the region between the adjacent cells, i.e., in the region 36 in FIG. 2C, while it tends to be reinforcing in the region 38 on each side of the center force vector L. The net result is that a plurality of force vectors L, applied along a line 39 to adjacent aligned cells arranged in a matrix 42 of cells, as seen in FIG. 2D, establish a wavefront 40 of turbulent fluid motion, or a vortex wavefront 40, along either side of the force vector line 39, i.e., on either side of the force vectors L. Such wavefront 40 may then be selectively moved along the surface of the matrix 42 by controlling the location where the current vector J is allowed to interact with the magnetic vector B.

Figure 2E:
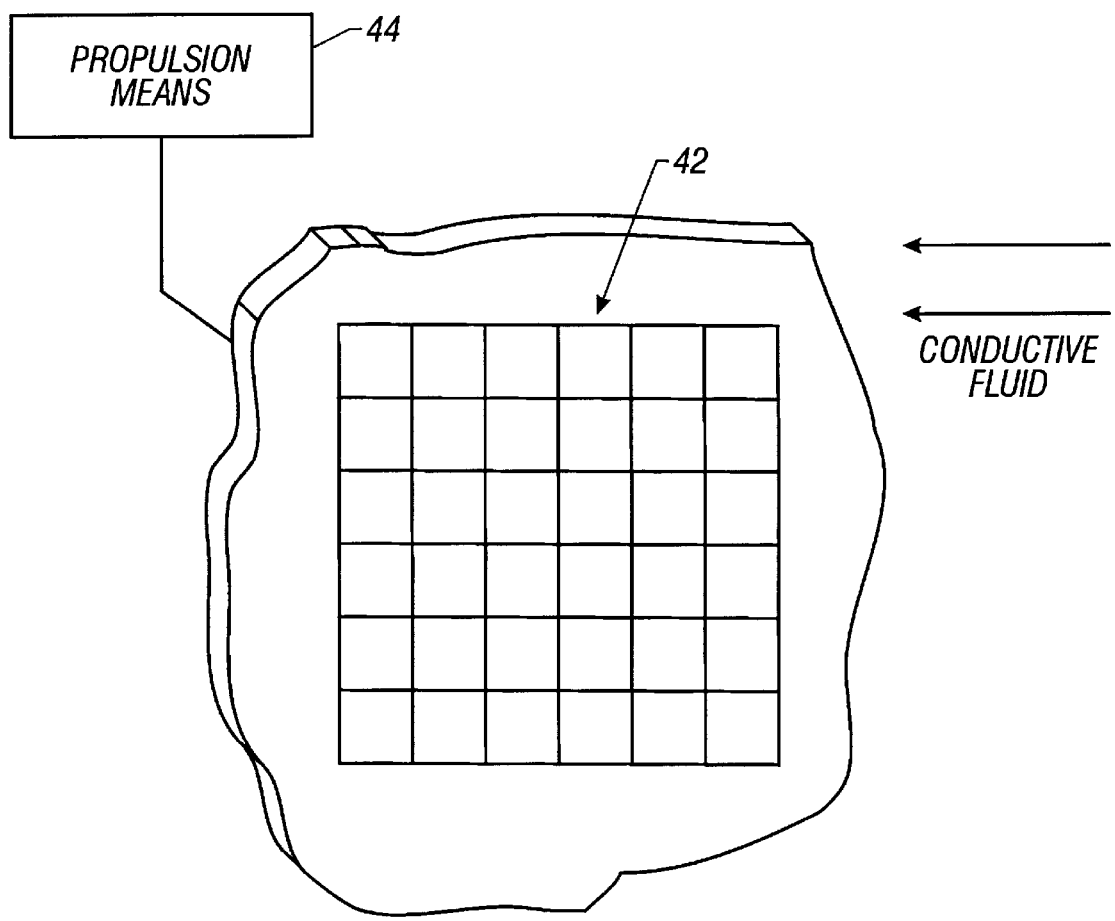
FIG. 2E depicts a panel formed of fluid control cell devices in accordance with the present invention being propelled through a conductive fluid.

Advantageously, a panel or matrix 42 of fluid control cell devices formed in accordance with the present invention, when propelled through a conductive fluid by a suitable propulsion means 44, and when the vortex wavefronts 40 are properly controlled, allows the friction or drag associated with the flow of the conductive fluid over the matrix to be significantly reduced. Thus, as illustrated in FIG. 2E, if the matrix 42 of control cell devices is attached to, or made an integral part of, a vessel structure, e.g., the hull of an ocean-going ship, it is possible, through selective control of the current vectors J which are imposed on the surface of the matrix, to create vortex wavefronts which reduce the drag of the hull as it cuts through the conductive sea water, thereby reducing the amount of energy required to move the vessel through the sea water. Here, and elsewhere throughout this application, the term "control cell device" refers to the electrodes, voltage source, panel or substrate, and magnets used to create a vector force L, when such control cell device is immersed in a conductive fluid.

Figure 3A:
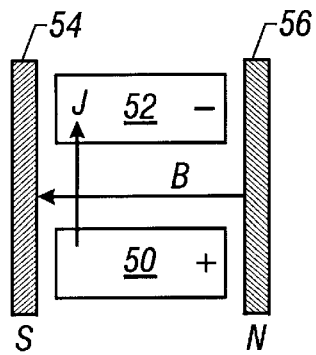
FIG. 3A shows a plan view of one type of basic control cell that may be used with the present invention.
Figure 3B:
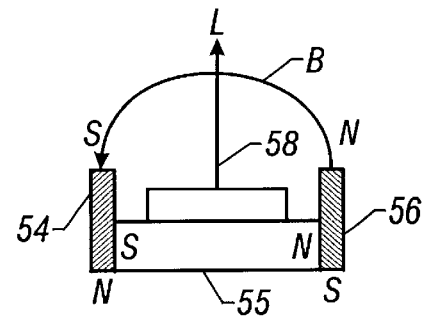
FIG. 3B shows a side view of the basic control cell shown in FIG. 3A.

Turning next to FIGS. 3A and 3B, there is shown one type of basic control cell device that may be made in accordance with the invention. FIG. 3A shows a plan view of one such basic control cell device; and FIG. 3B shows a side view of the basic control cell shown in FIG. 3A. As seen in these figures, electrodes 50 and 52 are energized with a suitable power source (not shown in these figures) so that electrode 50 is positive relative to electrode 52, thereby creating an electric field between the electrodes which causes an electric current to flow from electrode 50 to electrode 52. The flow of such current is represented by the current vector J.

Still with reference to FIGS. 3A and 3B, it is seen that three magnets, 54, 55, and 56, are positioned and polarized so as to create a magnetic field B in the region above the electrodes 50 and 52. Thus, when the electrodes 50 and 52 are immersed within a conductive fluid, so as to create the current vector J, the current vector J reacts with the magnetic field B so as to create the force vector L .

Figure 3C:
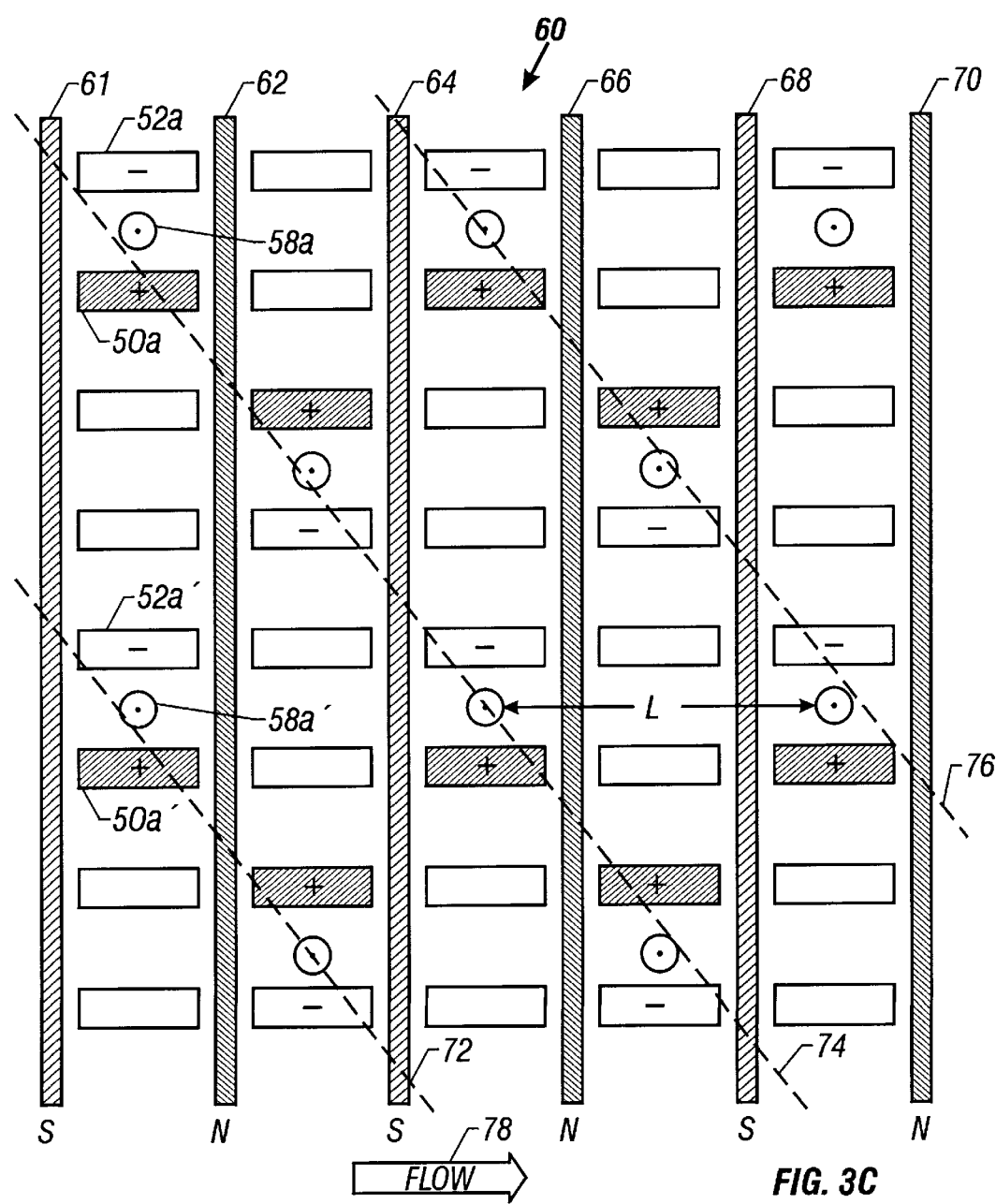
FIG. 3C shows an electromagnetic turbulence control (EMTC) panel made up of the basic cells shown in FIGS. 3A and 3B, and illustrates how, for unperturbed flow from left to right, an outwardly directed Lorentz force (shown as circles with dots inside) is created at each energized cell, which forces create roller wavefronts that parallel the dotted lines.

Next, with reference to the planar view of FIG. 3C, an example is shown of how individual control cells, as shown in FIGS. 3A and 3B, may be arranged in a matrix 60 in order to create a vortex wavefront. In the matrix 60 illustrated in FIG. 3C, elongate magnets 61, 62, 64, 66, 68 and 70 form a boundary between adjacent columns of control cells. Five columns of electrodes are shown, by way of example. Each column of control cells, includes eight electrodes, or four pairs of control cells. In the left column, for example, a first pair of electrodes 52a and 50a is energized so that a force vector 58a is created that points away from the plane of the paper. The second and fourth pair of electrodes in the left column are not energized, while the third pair of electrodes 50a', 52a' is energized, creating a force ector 58a'.

The electrodes in the right ($5^{th}$) and middle ($3^{rd}$) columns of the matrix 60 are energized in the same manner as are the electrodes in the left column. The electrodes in the second and fourth columns, on the other hand, are energized such that the second and fourth pair of electrodes are energized, while the first and third pair of electrodes are not energized.

Still referring to FIG. 3C, it is seen that each pair of energized electrodes allows a force vector L, pointing out of the paper, to be created. In combination, the energization of the electrode pairs shown in FIG. 3C, and the resulting force vectors L, creates a vortex wavefront aligned with the lines 72, 74 and 76.

Figure 3D:
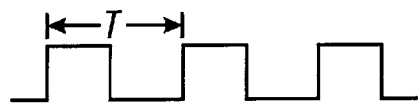
FIG. 3D illustrates one type of pulsing that may be applied to energize the electrode pairs.

The voltage applied to the electrodes in FIG. 3C is pulses as shown in FIG. 3D. As seen in FIG. 3D, the pulse period T is such that L~VT, where L is the distance between vortex wavefronts (shown in FIG. 3C) and v is the flow speed. The first application of the pulse sets up a set of propagating vortex wavefronts as shown in FIG. 3C. The voltage is then turned off and the wavefronts drift with the flow velocity (to the right in FIG. 3C). The vortex wavefronts have traveled a distance L when another pulse is applied to the electrodes. This pulse acts to constructively add to the existing flow of the vortex. In this way, the pulsing resonantly grows and maintains the strength of the vortices.

Various techniques may be used to construct the matrix panel 60, or other panels useful with the invention. Reference is made, for example, to U.S. patent application Ser. No. 09/100,307, filed on Jun. 19, 1998 assigned to the same assignee as is the present application, which application is incorporated hereby by reference.

As seen in FIG. 3C, the vortex wavefronts created are oblique (e.g., diagonal) with the fluid flow direction, illustrated by the arrow 78. Such an oblique wavefront may not be optimum for reducing fluid drag. Optimal reduction of fluid drag is produced with vortex wavefronts that are perpendicular to the unperturbed flow direction. For drag reduction, it is important that the tangential velocity produced by the vortex be parallel to the flow; and only the component along the flow direction contributes to the drag reduction effect. Thus, oblique vortex wavefronts are not efficiently used. A more optimum wavefront would be one that has the tangential velocity parallel with the fluid flow direction, i.e., one wherein the vortex wavefronts are oriented perpendicular to the unperturbed fluid flow.

An additional disadvantage of the energization scheme shown in FIGS. 3A–3D is that the distance between force locations along the vortex wavefront is large. This causes the wavefront not to be as well formed as it might otherwise-be if the force locations could be closer together.

Yet a further shortcoming associated with the energization scheme of FIGS. 3A–3D relates to the positioning of the magnets. That is, as seen in FIG. 3B, the normal component of the Lorentz force L is largest where the magnetic field is weakest. At the position of the maximum magnetic field on the surface of the magnet, no useful force is obtained. Thus, the magnetic force is not employed in a very efficient manner.

Moreover, it should be noted that most structures of a vessel designed to be propelled through a conductive fluid (e.g., vessels that would be used with the present invention) would employ, in one form or another, a curved surface or panel of some type, e.g., a cylindrical shape. Thus, it would be necessary to employ the matrix of cells shown in FIG. 3C on a curved panel. This would, in turn, require the use of curved magnets. Disadvantageously, curved magnets are more expensive than non-curved magnets. Also, in order to increase the magnetic field over the center of a tile or cell, a third magnet is used. Such third magnet causes complications in the magnet assembly.

In order to address the above concerns associated with the embodiment of the invention shown in FIGS. 3A–3C, i.e., in order to create a vortex wavefront that moves in the same direction as the fluid flow, and thereby reduce the drag associated with the fluid flow a maximum amount; and in order to also increase the density of the force centers, a preferred embodiment of the present invention utilizes a current multiplexing scheme to selectively energize only certain ones of the electrodes at the same time. Such multiplexing scheme advantageously assures a vortex wavefront that has tangential velocity components parallel to the fluid flow, and thus reduces drag associated with the flow of the fluid over the panel where the control cells are utilized i.e., a vortex wavefront is produced which propogates in a direction substantially parallel to the fluid flow, for example, as referred to in the discussions concerning FIG. 6.

Figure 4A:
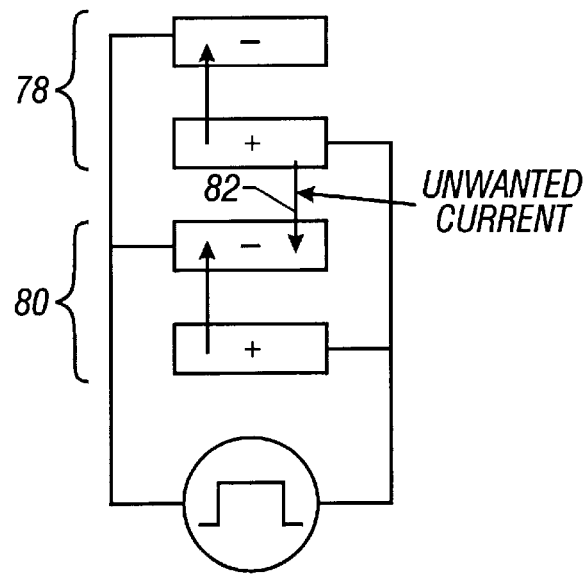
FIG. 4A is a simplified circuit diagram that illustrates ho unwanted currents may be created when only a single current driver is used.

To illustrate the need for current multiplexing, reference is made to FIG. 4A, which is a simplified circuit diagram that illustrates how unwanted currents may be created when only a single current driver is used. That is, as seen in FIG. 4A, if electrode pair 78 is energized at the same time as is adjacent electrode pair 80, some unwanted current 82 flows between the positive electrode of pair 78 and the negative electrode of pair 80. This unwanted current creates a force vector L that opposes the force vectors L created by the wanted currents, and is thus counterproductive to the formation of the desired vortex wavefront.

Figure 4B:
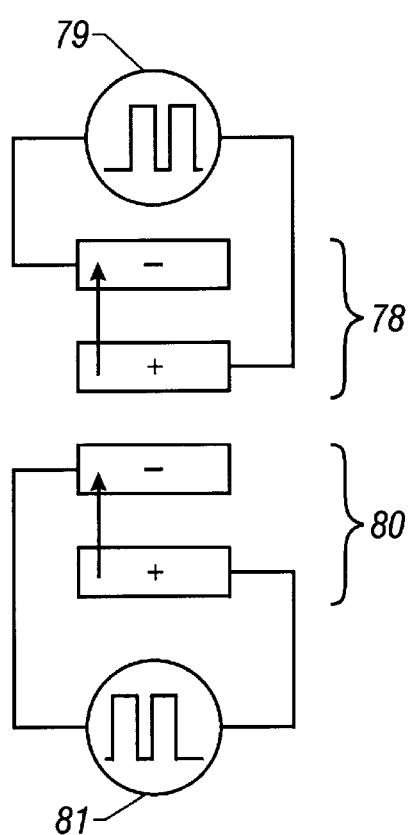
FIG. 4B shows the use of two multiplexed current drivers in accordance with the present invention in order avoid the unwanted currents of FIG. 4A.

To overcome the problem of unwanted current between adjacent electrode pairs, the present invention multiplexes the energization of the electrode pairs such that adjacent electrode pairs are not energized at the same time. Such multiplexing is illustrated in FIG. 4B As seen in FIG. 4B, the first pair of electrodes 78 is energized with a first current driver 79, and the second pair of electrodes 80 is energized with a second current driver 81. While only two current sources are shown in FIG. 4B, for illustration, it is to be understood that n current sources could be used, where n is an integer, depending upon the number of phases that are desired.

Figure 5:
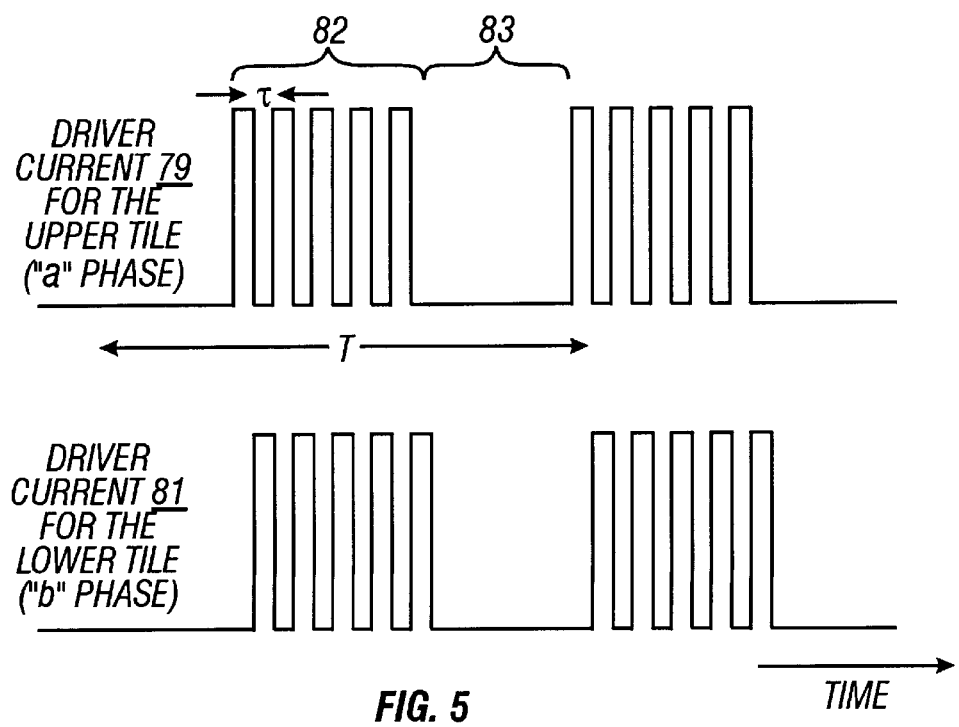
FIG. 5 is a timing waveform diagram that illustrates the concept of current multiplexing in accordance with the present invention.

The timing relationship between the current drivers 79 and 81 is illustrated in FIG. 5. As seen in FIG. 5, the current driver 79 for the electrode pair 78 is never on at the same time as is the current driver 81 for the electrode pair 80. The net result is that unwanted currents do not flow between adjacent electrode pairs.

As further seen in FIG. 5, the current drivers 78 and 80 each include a burst of square waves, each having a period τ. In FIG. 5, five such cycles of square waves are shown, comprising a first portion 82 of the current driver waveform, followed by a second portion 83 of the waveform wherein no signal is present. The period T of the envelope of the driver pulses, comprising the first and second portions, is determined by the resonant velocity required to grow the vortex wavefronts. The value of T is determined by the unperturbed flow velocity. By way of example, for a tile column spacing of 1.08 cm, and a flow velocity of about 10 m/sec, the corresponding period T is on the order of about one millisecond. It may also be an integral multiple of this time. For a two phase system, as shown in FIG. 5, each burst of pulses must fit within T/2, or approximately 500 μsec (microseconds). The minimum value of τ is about three times the shortest attainable risetime. The value of τ could, of course, be greater. In one exemplary embodiment, τ is on the order of about 5 μsec.

Figure 4C:
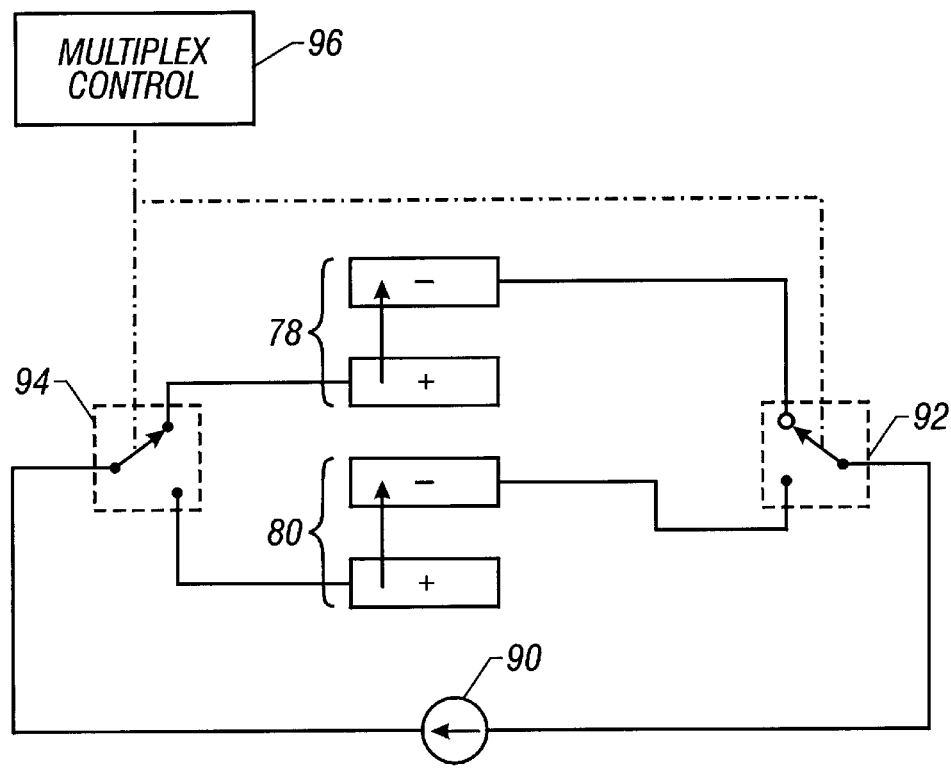
FIG. 4C illustrates the use of a single current driver switched by a multiplex control circuit to create two isolated current drivers.

An alternate multiplexing scheme, using a single current driver 90, is depicted in FIG. 4C. In FIG. 4C, the first pair of electrodes 78 is connected to the current driver 90 through switches 92 and 94. The connection is established so as to create a desired polarity between the electrodes of the pair 78. At the appropriate time, the switches 92 and 94 are switched, by multiplex control circuitry 96, so as to connect the current driver to the electrode pair 80. In this manner, only one electrode pair, 78 or 80, is allowed to energized at the same time.

Clearly, variations of the multiplexing schemes illustrated in FIGS. 4B and 4C and FIG. 5 are evident to those of skill in the art. The important criteria is that adjacent electrode pairs not be energized at the same time, and that the movement of the vortex wavefront be timed so as to match, approximately, the flow velocity of the conductive fluid. As indicated above, for example, for an n phase system, n different current sources could be employed, where n is an integer. By way of illustration, in one embodiment of the invention, eight (n=8) different current sources are used.

To illustrate operation of an eight phase system (n=8), reference is again made to FIG. 3C, which figure assumes five columns of eight electrodes each. During a first phase, or during a first portion of time that represents ⅛ of an energization cycle, the electrodes are energized as shown in FIG. 3C, i.e., the 1st and 3rd electrode pairs are energized in the 1st, 3rd, and 5th columns, while the 2d and 4th electrode pairs are energized in the 2d and 4th columns. Such energization pattern advantageously results in the vortex wavefronts along the lines 72, 74 and 76.

During a second portion of the energization cycle, which again represents ⅛ of the energization period, the pattern shown in FIG. 3C shifts up one electrode in each column of electrodes. That is, electrodes 52a and 52a' become the anodes of their respective electrode pairs, while electrodes 50a and 50a' are turned off, and with the electrodes immediately above 52a and 52a' becoming the cathodes. (Note, for purposes of FIG. 3C, the columns of electrodes are considered continuous, so that the electrode above electrode 52a is the electrode at the bottom of the column.) During a third portion of the energization cycle, which also represents ⅛ of the energization period or cycle, the electrodes immediately above electrodes 52a and 52a' become the anodes of their respective electrode pairs, while electrodes 52a and 52a' are turned off, and with the electrodes immediately below 50a and 50a' becoming the cathodes.

The above-described process continues, with the energization pattern of the column shifting up one electrode during each phase, or ⅛, of the energization cycle. Thus, after shifting up eight electrodes, or after one cycle, the energization pattern returns back to that shown in FIG. 3C. The net effect is that the vortex wavefronts 72, 74 and 76, for the pattern shown in FIG. 3C, propagate to the right, in the same direction as the flow arrow 78.

It is to be understood that an n phase system could also be implemented using n separate current or voltage sources, e.g., as shown in FIG. 4B for a two phase system; or through use of a single current or voltage source which is shared between n different pairs of electrodes, as taught in FIG. 4C.

Figure 6:
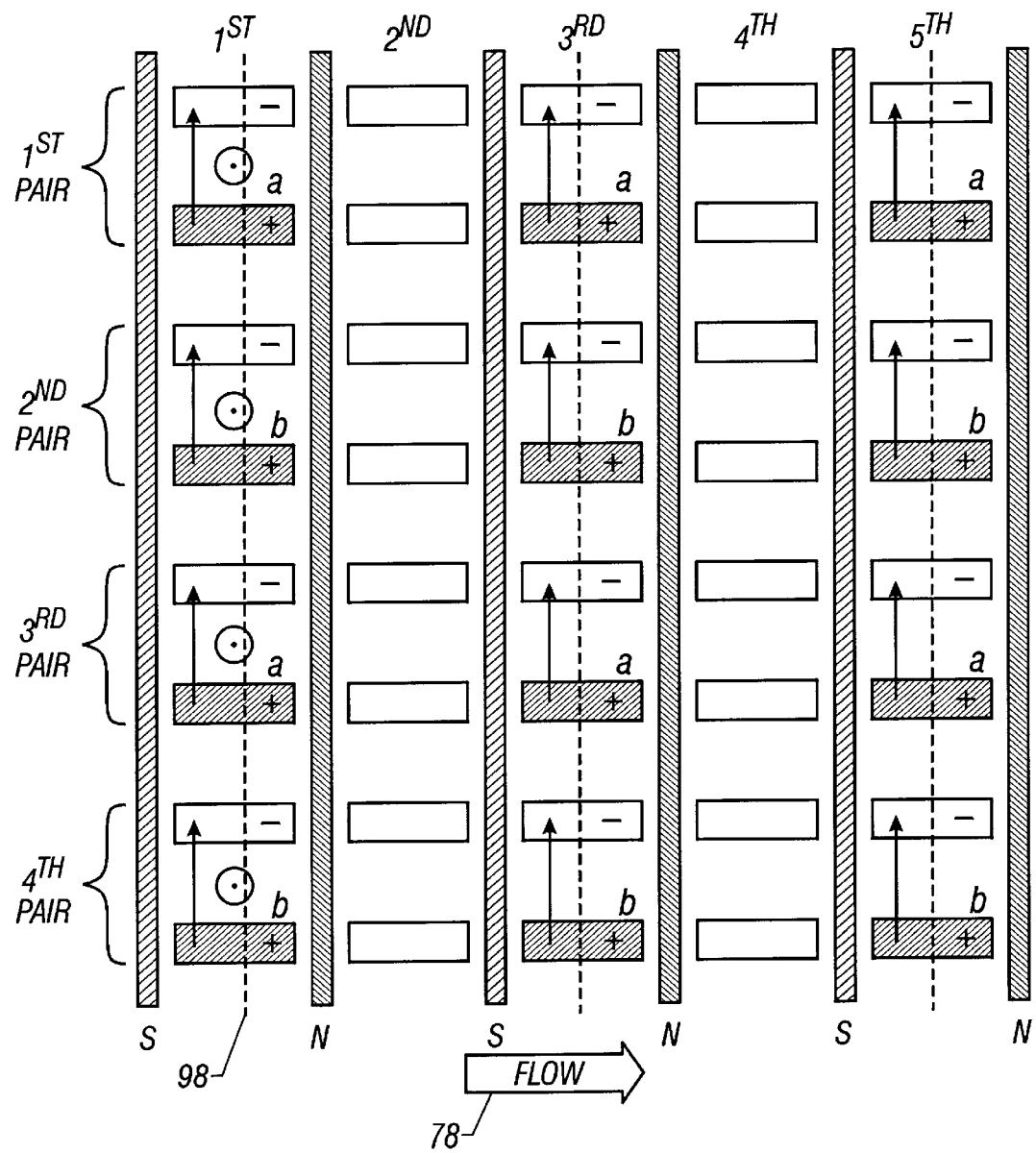
FIG. 6 shows a plan view of an EMTC panel made in accordance with the invention wherein two multiplexed current drivers, labeled a and b are used.

By using two multiplexed currents drivers as shown in FIG. 4B, or an equivalent circuit, a driving pattern as illustrated in FIG. 6 may be obtained. As seen in FIG. 6, adjacent columns are not energized at the same instant of time. That is, as shown in FIG. 6, only the $1^{st}$, $3^{rd}$, and $5^{th}$ columns of electrodes are energized, while the $2^{nd}$ and $4^{th}$ columns remain unenergized. Thus, no unwanted current flow is possible between electrode pairs of adjacent columns. Further, within the energized columns, the first and third electrode pairs are energized with one phase, e.g., the "a" phase; and the second and fourth electrode pairs are energized with a different phase, e.g., the "b" phase. The "a" and "b" phases are controlled so as to be as shown in FIG. 5, or equivalent, so that no adjacent electrode pairs are ever energized at the same time. Thus, no unwanted current flow is possible between adjacent electrode pairs within the same column. As a result, a vortex wavefront 98 is; created that is aligned with the fluid flow, i.e., the wavefronts 98 move in substantially the same direction as the fluid flow direction 78.

While not specifically shown in FIG. 6, it is to be understood that the $2^{nd}$ and $4^{th}$ columns of electrodes are similarly energized with a two phase signal at the same time that the $1^{st}$, $3^{rd}$, and $5^{th}$ columns of electrodes are not energized. This pattern of alternate column energization is what moves the resulting vortex wavefront along in the same direction as the fluid flow.

Additional phases and columns could also be used, as required, to best match the fluid flow. For example, a driving signal could be applied sequentially to energize three adjacent columns, with only one of the three columns being energized at a given time, and with the driving signal phased so that adjacent electrode pairs within the energized column are not energized at the same time.

A key consideration when using current multiplexing is to quickly change the force pattern (i.e., change the electrode pair that is energized) while the vortex wavefront is above the active cells. That is, the multiplexing time scale must be short compared to the dwell time of the vortex wavefront above the energized cells. Then, the wavefront is hit by a rapid succession of uniformly distributed impulses while it is essentially in one position. As a result, the average force given to the vortex wavefront, which may be conceptually visualized as a "roller" that rolls along the surface of the panel or structure on which the cells are located, is uniformly applied with closely spaced force centers.

As described above, it is thus seen that the present invention provides beneficial control of fluid motion over a surface, e.g., to reduce drag as a conductive fluid flows over the surface. More particularly, it is seen that through the use of a time-multiplexed current driver, Lorentz forces may be selectively created so as to establish a vortex wavefront, or "roller", having tangential velocity components that significantly reduce the drag associated with the flow of a conductive fluid over the control surface.

While the invention herein disclosed has been described by means of specific embodiments and applications thereof, numerous modifications and variations could be made thereto by those skilled in the art without departing from the scope of the invention set forth in the claims.

What is claimed is:

1. Apparatus for controlling flow of a conductive fluid over a control surface comprising:

a matrix of electrodes spread over the control surface;

means for biasing selected electrodes in a multiplicity of pairs so that two of the electrodes within the matrix of electrodes function as an electrode pair, with each electrode pair having an anode electrode and a cathode electrode, and so that an electrical current flows from the anode electrode of each electrode pair through the conductive fluid to the cathode electrode of the electrode pair;

means for generating a magnetic field having magnetic flux lines substantially orthogonal to the electrical current flowing through the conductive fluid between the anode and cathode electrodes;

whereby a Lorentz force orthogonal to both the electrical current and magnetic flux lines and substantially normal to the control surface is created, which Lorentz force affects the flow of the conductive fluid over the control surface;

wherein the biasing means includes means for time multiplexing the electrical current to assure a pattern of Lorentz forces that create a vortex wavefront that is substantially perpendicular to a direction of flow of said conductive fluid, said wavefront also propagating in a direction substantially parallel to said direction of flow, thereby affecting the flow of the conductive fluid over the control surface in a desired manner.

2. The apparatus of claim 1 wherein the time multiplexing means causes electrical current to be sourced from one anode electrode and sunk to a selected adjacent cathode electrode and not sunk to a non-selected adjacent cathode electrode.

3. The apparatus of claim 2 wherein the time multiplexing means comprises a first current source that biases a first group of the electrode pairs to cause a first electrical current to flow between the anode and cathode of each electrode pair within the first group of electrode pairs, a second current source that biases a second group of the electrode pairs to cause a second electrical current to flow between the anode and cathode of each electrode pair within the second group of electrode pairs, and timing means for controlling the first and second current sources so that only one current source is operative at any given time.

4. The apparatus of claim 3 wherein electrode pairs within the first group of electrode pairs are adjacent only to electrode pairs within the second group of electrode pairs.

5. The apparatus of claim 3 wherein the matrix of electrodes has rows and columns of electrodes, and wherein each electrode in each row may be connected as either an anode or a cathode of an electrode pair, and further wherein, for a column of said electrodes, the electrodes are paired with an adjacent electrode within the column, and the first group of electrode pairs comprises every other electrode pair within the column, and the second group of electrode pairs comprises the other electrode pairs in the column not included in the first group of electrode pairs.

6. The apparatus of claim 5 wherein the time multiplexing means further includes means for applying the first current source to energize electrodes within the first group of electrode pairs residing in every other column of the matrix of electrodes during a first portion of a first period of time, means for applying the second current source to energize electrodes within the second group of electrode pairs within the same every other column of the matrix of electrodes during a second portion of the first period of time, means for applying the first current source to energize electrodes within the first group of electrode. pairs residing in the columns of the matrix of electrodes not energized during the first period of time during a first portion of a second period of time, and means for applying the second current source to energize electrodes within the second group of electrode pairs residing in the columns of the matrix of electrodes not energized during the first period of time during a second portion of the second period of time.

7. The apparatus of claim 2 wherein the time multiplexing means comprises n current sources, where n is an integer of at least 3, wherein each of the n current sources simultaneously energizes a select group of electrode pairs during (1/n)th of an energization cycle at a time when the remaining current sources do not energize any electrode pairs.

8. The apparatus of claim 7 wherein each of the electrode pairs which are energized during each (1/n)th portion of the energization cycle are not adjacent each other.

9. The apparatus of claim 8 wherein the matrix of electrodes has rows and columns of electrodes, and wherein each electrode in each column may be connected as either an anode or a cathode of an electrode pair.

10. The apparatus of claim 9 wherein the time multiplexing means further includes means for causing each electrode in each column of electrodes to assume one of the following states: an anode, a cathode, or a non-energized electrode; and wherein pairs of electrodes always comprise electrodes adjacent each other in the column of electrodes.

11. The apparatus of claim 2 wherein the time multiplexing means comprises:

a current source for generating an electrical current;

switch means for applying the current source to one of a plurality of electrode-pair sets as a function of a control signal;

multiplex control means for generating the control signal, the control signal determining which of the plurality of electrode-pair sets receives the electrical current generated by the current source.

12. The apparatus of claim 11 wherein the multiplex control means comprises means for time-multiplexing the electrical current between each of the electrode-pair sets in equal segments of time.

13. Apparatus for controlling the flow of a conductive fluid comprising:

a control surface immersible within said conductive fluid;

means for propelling the control surface through the conductive fluid;

means for electromagnetically generating at least one vortex wavefront on the control surface at substantially right angles to the direction of fluid flow over the control surface as the control surface moves through the conductive fluid, said vortex wavefront reducing the drag associated with the flow of the conductive fluid over the control surface.

14. The apparatus for controlling the flow of a conductive fluid as set forth in claim 13 wherein said electromagnetic vortex wavefront generating means comprises:

a matrix of electrodes spread over the control surface;

means for biasing selected electrodes within the matrix of electrodes as electrode-pair sets, each set of electrode-pair sets including a plurality of electrode pairs, each electrode pair having an anode electrode and a cathode electrode, and wherein each biased electrode pair allows an electrical current to flow from the anode electrode of each electrode pair through the conductive fluid to the cathode electrode of the electrode pair;

said means for biasing selected electrodes enabling biasing of each electrode-pair set at a time different from when other electrode-pair sets are biased such that electrical current flows only from the anode electrode to the cathode electrode of the electrode pairs in one electrode-pair set at any given time;

means for generating a magnetic field having magnetic flux lines substantially orthogonal to the electrical current flowing through the conductive fluid between the anode and cathode electrodes;

said electrical current and said magnetic field interacting to form a Lorentz force substantially orthogonal to both the electrical current and magnetic flux lines; and wherein the Lorentz forces associated with all of the selected electrode pairs of each electrode-pair set combine to produce said electromagnetic vortex wavefront.

15. The apparatus for controlling the flow of a conductive fluid as set forth in claim 14 wherein the biasing means comprises:
- a first current source that biases electrode pairs of a first electrode-pair set so as to cause a first electrical current to flow between the anode and cathode of each electrode pair within the first electrode-pair set,
- a second current source that biases a electrode pairs of a second electrode-pair set so as to cause a second electrical current to flow between the anode and cathode of each electrode pair within the second electrode-pair set, and
- timing means for controlling the first and second current sources so that only one current source is operative at any given time.

16. The apparatus for controlling the flow of a conductive fluid as set forth in claim 15 wherein electrode pairs within the first electrode-pair set are adjacent only to electrode pairs within the second electrode-pair set.

17. The apparatus of claim 15 wherein the biasing means comprises n current sources, where n is an integer of at least 3, wherein each of the n current sources biases an mth electrode-pair set, where m is an integer from 1 to n, to cause an electrical current to flow between the anode and cathode of the electrode pairs within the mth electrode-pair set; and wherein the timing means comprises means for controlling the n current sources so that only one current source is operative at a time.

18. The apparatus of claim 17 wherein each of the electrode pairs within the mth electrode-pair set are not adjacent each other.

19. The apparatus for controlling the flow of a conductive fluid as set forth in claim 15 wherein the biasing means comprises:
- a current source for generating an electrical current;
- switch means for applying the current source to one of the plurality of electrode-pair sets as a function of a control signal;
- multiplex control means for generating the control signal, the control signal determining which of the plurality of electrode-pair sets receives the electrical current generated by the current source.

20. A control surface, immersible in a conductive fluid having a direction of flow over said control surface, comprising:
- surface structure;
- a plurality of magnets affixed to the surface structure to create a magnetic field having magnetic flux lines;
- an array of paired electrodes arranged on the surface structure so that an electric field created between adjacent electrodes is approximately orthogonal to the magnetic flux lines;
- said electric field and said magnetic field interacting to form a Lorentz force orthogonal to both the electric field and magnetic flux lines in the presence of an electrical current flowing between adjacent electrodes in alignment with the electric field; and
- control means for energizing the paired electrodes to create an electric field between adjacent electrodes in a time-multiplexed manner so that at least a first subset of the paired electrodes are energized at a time different from when a second subset of the paired electrodes are energized to form said Lorentz force with a desired distribution such that a vortex wavefront is formed in said conductive fluid, said vortex wavefront being perpendicular to said direction of flow over said control surface.

21. The control surface of claim 20 wherein said control means comprises two current sources, each attached to one of said first or second subsets of paired electrodes, and means for energizing only one of said first or second current sources at the same time.

22. The control surface of claim 20 wherein said control means comprises n current sources, where n is an integer of at least three, wherein each current source is coupled to a respective nth subset of paired electrodes, and including means for energizing only one of said nth current sources at the same time.

23. The control surface of claim 20 wherein said control means comprises a current source, a switch matrix that operatively connects the current source to the first subset of paired electrodes during a first time period and to the second subset of paired electrodes during a second time period, and timing means for controlling the switch matrix to connect only one subset of paired electrodes to the current source at the same time.

24. Apparatus for controlling flow of a conductive fluid over a control surface comprising:
- a matrix of electrodes spread over the control surface in columns;
- a means for biasing selected electrodes in a multiplicity of pairs so that two of the electrodes within the matrix of electrodes function as an electrode pair, with each electrode pair having an anode electrode and a cathode electrode, and so that an electrical current flows from the anode electrode of each electrode pair through the conductive fluid to the cathode electrode of the electrode pair;
- a means for generating a magnetic field having magnetic flux lines substantially orthogonal to the electrical current flowing through the conductive fluid between the anode and cathode electrodes;
- said electrical current and said magnetic field interacting to form a Lorentz force orthogonal to both the electrical current and magnetic flux lines, which Lorentz force generates a vortex wavefront in said conductive fluid;
- said biasing means further including a means for time multiplexing the electrical current to assure a pattern of Lorentz forces such that said vortex wavefront is substantially perpendicular to a direction of flow of said conductive fluid, said wavefront also propagating in a direction substantially parallel to said direction of flow.

25. The apparatus of claim 24 wherein said biasing means includes:
- a current source that alternatively biases a first group of the electrode pairs to cause a first electrical current to flow between the anode and cathode of each electrode pair within the first group of electrode pairs and that biases a second group of the electrode pairs to cause a second electrical current to flow between the anode and cathode of each electrode pair within the second group of electrode pairs.

26. The apparatus of claim 25 wherein the time multiplexing means comprises:
- a first current driver that biases said first group of the electrode pairs to cause the first electrical current to flow between the anode and cathode of each electrode pair within the first group of electrode pairs, a second current driver that biases the second group of the electrode pairs to cause the second electrical current to flow between the anode and cathode of each electrode pair within the second group of electrode pairs, and a timing means for controlling the first and second current sources so that only one current source is operative at any given time.

27. The apparatus of claim 24 wherein said biasing means includes:

a current source that alternatively biases a first group of the electrode pairs while deactivating a second group of said electrode pairs and then biases said second group of the electrode pairs while deactivating said first group of said electrode pairs, said alternating bias and deactivation occurring in periodic pulses while the vortex wavefront passes above said first group and said second group of electrode pairs, the period T of said pulses being determined by a resonant velocity required to maximize the vortex wavefront intensity.

28. The apparatus of claim 27, wherein said current source alternating bias and deactivation pulses may have a period which is an integral multiple of said period T of said pulses being determined by the resonant velocity required to maximize the vortex wavefront intensity.

29. An apparatus for generating at least one vortex wavefront adjacent to a control surface as the control surface flows through a conductive fluid, the apparatus comprising:

a matrix of electrodes spread over the control surface in columns of adjacent electrode pairs;

a means for energizing selected electrode pairs such that each energized electrode pair includes an anode and a cathode and electrical current flows through the conductive fluid from the anode to the cathode of each selected electrode pair;

a means for generating a magnetic field having magnetic flux lines which are substantially orthogonal to the electrical current flowing between the anode and cathode of each selected electrode pair;

the electrical current and the magnetic field interacting to form a Lorentz force orthogonal to both the electrical current and the magnetic flux lines, which Lorentz force generates a vortex wavefront in said conductive fluid;

said energizing means further including a means for time multiplexing the electrical current to assure a pattern of Lorentz forces such that said vortex wavefront is substantially perpendicular to the conductive fluid flow, said wavefront also propagating in a direction substantially parallel to the direction of said conductive fluid flow.

30. An apparatus as in claim 29 wherein said means for time multiplexing the electrical current multiplexes the energization of said electrode pairs such that adjacent electrode pairs are not energized at the same time.

31. An apparatus as in claim 29, wherein said matrix of electrodes spread over the control surface in columns of adjacent electrode pairs includes each column having an alternating plurality of first electrode pairs and second electrode pairs;

said energizing means including a first current driver for energizing said first electrode pairs and a second current driver for energizing said second electrode pairs; and said means for time multiplexing controls the first and second current drivers such that only one of said first electrode pairs and said second electrode pairs are energized at the same time.

32. An apparatus as in claim 31, wherein said means for time multiplexing the first and second current drivers such that only one of said first electrode pairs and said second electrode pairs are energized at the same time alternates energizing said first electrode pairs and said second electrode pairs in pulses having a period which grows and maintains the strength of said vortex wavefront.

33. An apparatus as in claim 32, wherein said energizing pulses of said time multiplexing means include a burst of periodic current which alternates energizing said first electrode pairs and said second electrode pairs over said pulse period in a plurality of cycles, the number of said plurality of cycles being determined by a function of a flow speed of said conductive fluid over said control surface.

34. An apparatus as in claim 33, wherein said burst of periodic current comprises a burst of square waves.

35. An apparatus as in claim 32, wherein said energizing pulses of said time multiplexing means include a burst of periodic current which alternates energizing said first electrode pairs and said second electrode pairs over said pulse period in a plurality of cycles being determined by an integral multiple of a function of a flow speed of said conductive fluid over said control surface.

36. An apparatus as in claim 35, wherein said burst of periodic current comprises a burst of square waves.

37. An apparatus as in claim 31, wherein said at least one vortex wavefront comprises at least two vortex wavefronts and wherein said means for time multiplexing the first and second current drivers such that only one of said first electrode pairs and said second electrode pairs are energized at the same time alternates energizing said first electrode pairs and said second electrode pairs in pulses having a period which is approximated by a function of a distance between said vortex wavefronts and a flow speed of said conductive fluid.

38. An apparatus as in claim 29, wherein said matrix of electrodes spread over the control surface in columns of adjacent electrode pairs includes each column having a plurality of n electrode pairs;

said energizing means including n current drivers for energizing each of said n electrode pairs; and said means for time multiplexing controls the n current drivers such that only one of said n pairs is energized at the same time.

39. An apparatus as in claim 29, wherein said matrix of electrodes spread over the control surface in columns of adjacent electrode pairs includes each column having an alternating plurality of first electrode pairs and second electrode pairs;

said energizing means including a single current driver operatively connected to a switching means for energizing said first electrode pairs and said second electrode pairs; and said means for time multiplexing controls the switching means such that only one of said first electrode pairs and said second electrode pairs are energized at the same time.

40. An apparatus as in claim 39, wherein said means for time multiplexing the single current driver alternates energizing said first electrode pairs and said second electrode pairs in pulses having a period which grows and maintains the strength of said vortex wavefront.

* * * * *